A. S. CHESTON.
FOLDING OR COLLAPSIBLE HEAD OR HOOD OF VEHICLES.
APPLICATION FILED APR. 29, 1920.
1,391,369.
Patented Sept. 20, 1921.
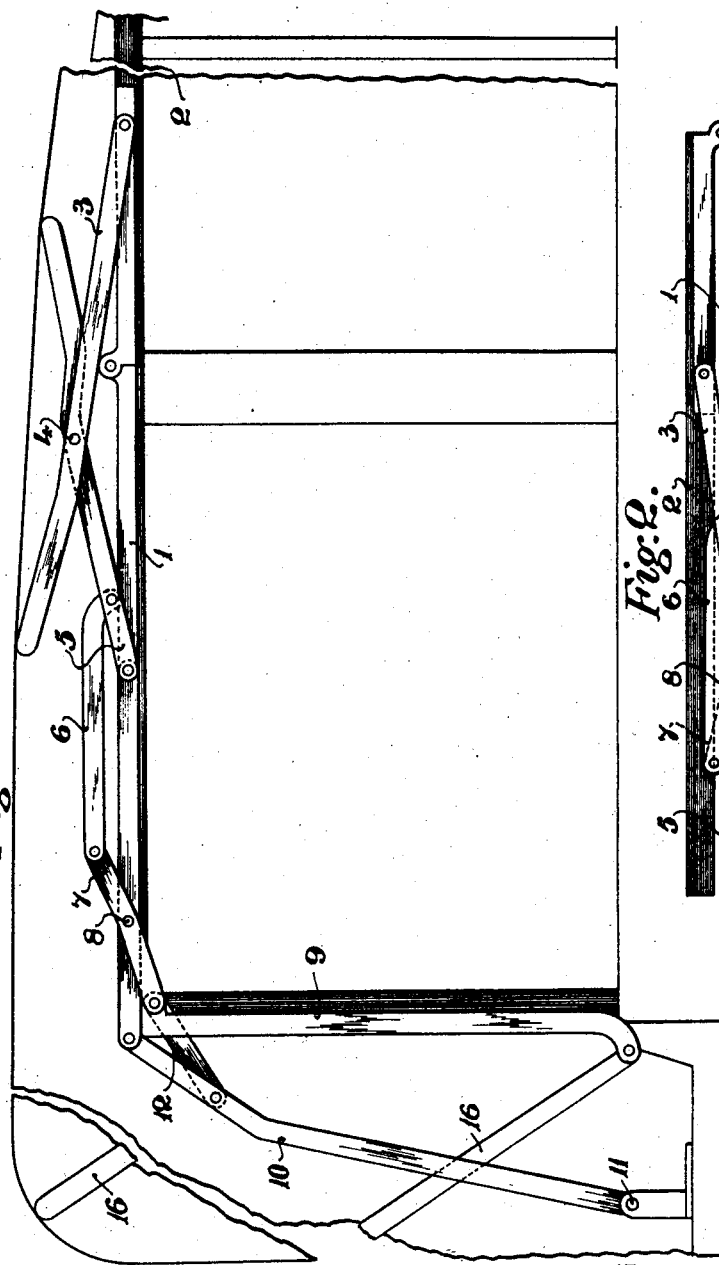
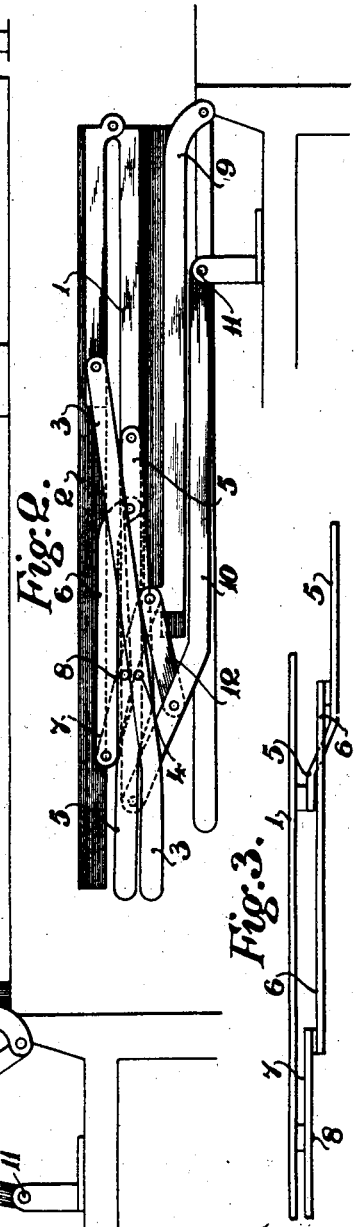
Inventor
Arthur Sam Cheston
by
Attorney

UNITED STATES PATENT OFFICE.

ARTHUR SAM CHESTON, OF LONDON, ENGLAND.

FOLDING OR COLLAPSIBLE HEAD OR HOOD OF VEHICLES.

1,391,369. Specification of Letters Patent. Patented Sept. 20, 1921.

Application filed April 29, 1920. Serial No. 377,665.

*To all whom it may concern:*

Be it known that ARTHUR SAM CHESTON, a subject of the King of Great Britain, residing at London, England, has invented certain new and useful Improvements in Folding or Collapsible Heads or Hoods of Vehicles, of which the following is a specification.

This invention relates to folding head or hood fittings for motor and other vehicles, such vehicles being either of the coupé, cabriolet, landaulet and similar types, or of the open type.

The object of the present invention is to provide a simplified means for folding or collapsing the hood at the rear of the vehicle, which enables the cant-rail or equivalent member and the extension frame to lie substantially level with the back stick and behind the pillar or the like when the hood is collapsed, and without interfering with the free use of a door in the rear portion of the body.

According to the invention, the cant-rail or equivalent member is connected by a link to the pillar or main upright and is controlled by a rear stay which is pivoted to the body of the vehicle and connected to the pillar or upright by a link, so as to be constrained, when the hood is collapsed, to fold into a position parallel with the pillar or upright and to move rearward so as to extend beyond the end of the pillar or the like.

Figure 1 of the accompanying drawings is a side elevation showing the application of one form of the invention, to a folding hood for a coupé or similar type of vehicle, the hood being shown in its extended condition.

Fig. 2 shows the hood when collapsed.

Fig. 3 is a plan of the members which are associated with the cant-rail.

Referring to the drawings, 1 designates the cant-rail and shown as hinged to the forward end of the same is a horizontal front extension frame 2 adapted to be folded upward and rearward so as to lie over the cant-rail, as shown in Fig. 2. This extension frame 2 carries a rearwardly inclined hoop-stick 3 pivoted at 4 to a forwardly inclined hoop-stick 5 which is hinged to the cant-rail; and this latter hoop-stick 5 is connected, by a horizontal link 6, to the upper and forward arm of an inclined lever 7 pivoted at 8 to the cant-rail and connected, at its lower and rear end, to the upper portion of the pillar 9. The rear end of the cant-rail 1 is jointed to the upper end of a back stay 10 which is pivoted at its lower end, at 11, to the vehicle frame behind the pillar, this stay being connected, near its upper end, to the upper end of the pillar 9 by means of a link 12.

When the front extension frame 2 is raised and pushed back, its hoop-stick 3 operates the hoop-stick 5 on the cant-rail, and this, in turn, through the medium of the horizontal link 6, operates the lever 7 between the cant-rail and pillar, whereby the cant-rail is raised and moved rearward, the angular movement thus imparted to the rear stay drawing down the pillar and causing the cant-rail to move beyond the end of the pillar and finally to lie horizontal above the latter, as shown in Fig. 2.

The application of the invention to hoods for open vehicles differs in no essential respect from its application to folding heads of coupé and like vehicles, as described above.

Having fully described my invention, what I desire to claim and secure by Letters Patent is:—

1. In hoods for vehicles, the combination with a cant-rail, of a folding pillar, a link connecting said pillar to the cant-rail, a hinged rear stay pivoted at its upper end directly to the cant-rail, and a link connecting said pillar and the rear stay, so that when the hood is collapsed, the rear stay causes said cant-rail to move rearward relatively to the pillar so that the rear end of the cant-rail extends beyond the end of the pillar.

2. In hoods of vehicles, the combination with a cant-rail or equivalent member, of a front extension frame hinged to the forward end of said cant-rail or the like, a forward hoop-stick operated by the extension frame, a lever pivoted to the cant-rail having one end connected to the said hoop-stick by a link and the end jointed to the pillar or main upright, and a hinged rear stay jointed at its upper end directly to the cant-rail or the like and connected to the pillar or upright by a link, so that when the hood is collapsed, the rear stay causes the said cant-rail or the like to move rearward beyond the end of the pillar and the latter to fold down, substantially as described.

In testimony whereof I have signed my name to this specification in the presence of two subscribing witnesses.

ARTHUR SAM CHESTON.

Witnesses:
H. N. SKERRETT,
W. S. SKERRETT.